United States Patent
Sadjadpour et al.

(10) Patent No.: US 11,334,676 B2
(45) Date of Patent: May 17, 2022

(54) COMPACT KEY ENCODING OF DATA FOR PUBLIC EXPOSURE SUCH AS CLOUD STORAGE

(71) Applicant: The Regents of the University of California, Oakland, CA (US)

(72) Inventors: Hamid R. Sadjadpour, Santa Cruz, CA (US); Mohsen Karimzadeh Kiskani, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 19 days.

(21) Appl. No.: 15/733,795

(22) PCT Filed: Apr. 25, 2019

(86) PCT No.: PCT/US2019/029139
§ 371 (c)(1),
(2) Date: Oct. 26, 2020

(87) PCT Pub. No.: WO2020/036650
PCT Pub. Date: Feb. 20, 2020

(65) Prior Publication Data
US 2021/0124832 A1 Apr. 29, 2021

Related U.S. Application Data

(60) Provisional application No. 62/727,636, filed on Sep. 6, 2018, provisional application No. 62/662,557, filed on Apr. 25, 2018.

(51) Int. Cl.
*G06F 21/62* (2013.01)
(52) U.S. Cl.
CPC .............................. *G06F 21/6209* (2013.01)

(58) Field of Classification Search
CPC .................................................. G06F 21/6209
See application file for complete search history.

(56) References Cited

U.S. PATENT DOCUMENTS 6,868,495 B1 * 3/2005 Glover .................... G06F 9/445
713/190
9,189,638 B1 11/2015 Yung et al.
(Continued)

FOREIGN PATENT DOCUMENTS

WO WO2008/065351 A1 6/2008

OTHER PUBLICATIONS

International Search Report and Written Opinion for International Patent Application No. PCT/US19/29139 dated Feb. 6, 2020, pp. 1-8.
(Continued)

*Primary Examiner* — Vance M Little
(74) *Attorney, Agent, or Firm* — Wolter Van Dyke Davis, PLLC; Eugene J. Molinelli

(57) ABSTRACT

Techniques for secure public exposure of digital data include extracting n chunks, each containing Q bits, n=2(Q+1). A random mapping of each chunk to only one batch of M numbered batches is determined and stored securely. A bit based on a random key is combined at a location based on batch number with each of the chunks in the batch to produce a batch of enhanced chunks, each containing Q+1 bits. This is repeated with each non-overlapping batch of chunks, each enhanced chunk of the batch having one bit based on a different bit from the key. A unique set of the enhanced chunks is combined with a XOR to produce an encoded chunk, every bit of which is based on a bit from the key. An encoding vector B that indicates the unique set is stored securely. The encoded chunk can be safely exposed publically.

10 Claims, 6 Drawing Sheets

(56) References Cited

U.S. PATENT DOCUMENTS

| | | | |
|---|---|---|---|
| 9,298,939 B2* | 3/2016 | Margolin | G06F 21/10 |
| 10,268,832 B1* | 4/2019 | Ciubotariu | G06F 21/6209 |
| 2003/0120684 A1* | 6/2003 | Zuili | H04L 63/08 |
| 2009/0077377 A1* | 3/2009 | Cobelo | G06F 21/6209 |
| | | | 713/165 |
| 2010/0150344 A1 | 6/2010 | Karroumi et al. | |
| 2010/0235649 A1* | 9/2010 | Jeffries | G06F 21/6209 |
| | | | 713/189 |
| 2011/0029588 A1 | 2/2011 | Ross | |
| 2011/0246433 A1* | 10/2011 | Sun | G06F 16/10 |
| | | | 707/698 |
| 2012/0036366 A1* | 2/2012 | May | G06F 21/6209 |
| | | | 713/176 |
| 2013/0111196 A1* | 5/2013 | Pasam | G06F 21/575 |
| | | | 713/1 |
| 2014/0237614 A1* | 8/2014 | Irvine | H04L 9/3247 |
| | | | 726/26 |
| 2016/0267291 A1 | 9/2016 | Androulaki et al. | |
| 2016/0330181 A1 | 11/2016 | Resch et al. | |
| 2017/0104586 A1 | 4/2017 | Hars | |
| 2017/0237552 A1 | 8/2017 | Karame | |
| 2018/0248887 A1* | 8/2018 | Sayed | H04L 63/105 |

OTHER PUBLICATIONS

Kadhe et al. "Weakly Secure Regenerating Codes for Distributed Storage." In: Cornell University Library/Computer Science/Information Theory, May 12, 2014, pp. 1-15.

Bellare et al. "Encode-then-encipher encryption: How to exploit nonces or redundancy in plaintexts for efficient cryptography." In: Cornell University Library/Computer Science/Information Theory, Dec. 2000, pp. 1-15.

\* cited by examiner

COMPACT KEY ENCODING OF DATA FOR PUBLIC EXPOSURE SUCH AS CLOUD STORAGE

CROSS-REFERENCE TO RELATED APPLICATIONS

This application claims benefit under 35 U.S.C. § 119(e) of Provisional Appln. 62/662,557, filed Apr. 25, 2018, and Provisional Appln. 62/727,636, filed Sep. 6, 2018, the entire contents of each of which are hereby incorporated by reference as if fully set forth herein.

BACKGROUND

Claude Shannon introduced a cipher system in [1] which achieves perfect secrecy. The notion of perfect secrecy in Shannon's work means that no eavesdropper can deduce any information about the transmitted message regardless of its computational power. He studied the fundamental communication requirements that are necessary and sufficient to guarantee that "Alice" can send messages to "Bob" in a way that "Eve" cannot obtain any information about the transmitted messages. Shannon proved that if Alice uses a different key, selected uniformly at random from the set of all keys for each message, then perfect secrecy is achievable. This communication channel has been studied extensively since then and is the basis for sensitive communication systems including the one-time-pad (or Vernam pad) system used for communications between Moscow and Washington, D.C. during the cold war. However, the downside of this system is the size of the key which should be as large as the size of the message to guarantee secure communications.

SUMMARY

Techniques are provided for compact key encoding of data for public exposure, such as cloud storage, that provides a substantially higher level of security, including perfect security in some embodiments, or substantially smaller keys than in previous approaches, or some combination.

In a first set of embodiments, a method implemented on a hardware processor provides secure public digital storage. The method includes extracting first digital data comprising a number n of portions called chunks, each chunk containing a number Q of bits, wherein $n=2(Q+1)$. The method also includes determining a first random value for mapping each chunk to only one batch of M numbered batches of two or more chunks of the n chunks, and storing securely second digital data that indicates the mapping. Furthermore, the method includes determining a second independent random value for a key containing Q+1 bits. The method further includes combining a bit based on a bit from the key with each chunk of a next batch of chunks to produce a next batch of enhanced chunks. Each enhanced chunk contains Q+1 bits and each enhanced chunk of the next batch of enhanced chunks has a bit based on the bit from the key at a location based on a number of the next chunk. The method still further includes repeating said combining step with each non-overlapping batch of chunks to produce non-overlapping enhanced chunks. Each enhanced chunk of the non-overlapping batch of enhanced chunks has a bit based on a different bit from the key. The method yet further includes combining a unique set of the enhanced chunks with a bit by bit exclusive OR operation to produce an encoded chunk so that every bit of the encoded chunk is based at least in part on a bit from the key. Still further, the method includes storing securely third data that indicates an encoding vector b that indicates the unique set of enhanced chunks combined. Even further still, the method includes causing the encoded chunk to be exposed publicly.

In other sets of embodiments, a computer readable medium, or apparatus, or system is configured to perform one or more steps of the above method or to store the encoded data produced by the above method.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Figure 1:
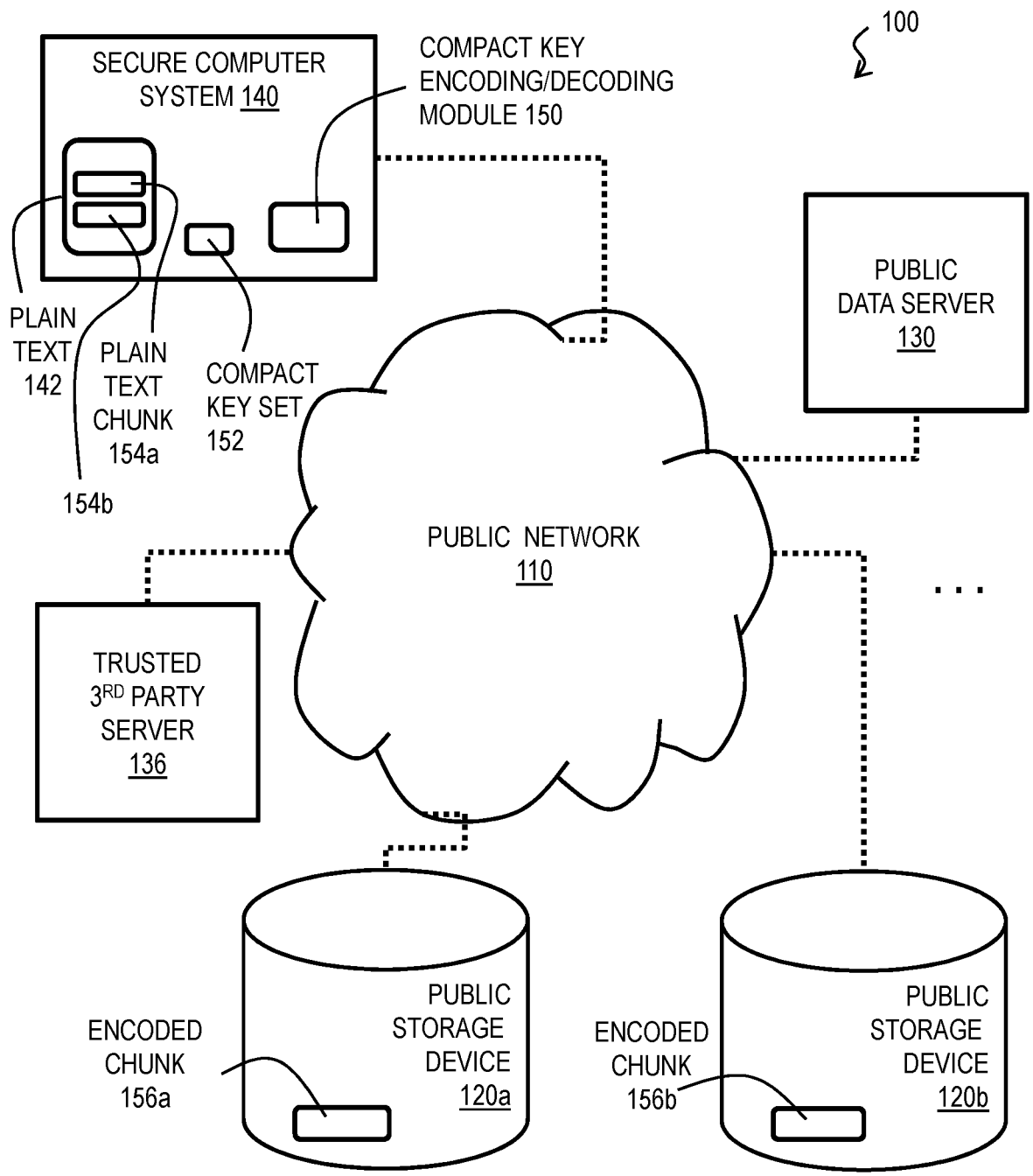
FIG. 1 is a block diagram that illustrates an example system for producing encoded data that is exposed to the public with complete secrecy and a compact key, according to an embodiment.

A method, computer readable medium, apparatus and system are described for compact key encoding of data for public exposure, such as in cloud storage. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of public cloud-based data storage, e.g., data storage on a network that is at least in part exposed to public access. However, the invention is not limited to this context. In other embodiments the encoding is used in communications, such as over wireless cellular and ad hoc networks, with a trusted partner for whom a perfectly secure channel is available for delivering the compact key or plaintext or some combination.

1. Description of Problem

In the classical Shannon problem, Alice uses a random coding mechanism to achieve perfect secrecy by encrypting a message with a unique key that is selected uniformly at random from the set of all keys. The number of keys is at least as large as the number of messages. Bob also gets the same set of keys and uses them for decrypting. No change to the number of bits is involved; thus, these reversible processes are called encrypting and decrypting. Eve does not have these keys and cannot decrypt. In this scheme, if Alice wants to achieve perfect secrecy for data transmission, she needs to transmit all random keys to Bob and Bob needs to store them for data decryption. Since the size of key bits is as large as the size of message bits, using Shannon cipher for many applications including distributed cloud storage systems is not practical.

The communication model in distributed cloud storage systems is different from traditional communication model discussed by Shannon in [1]. In a cloud storage model, Alice wants to store some data on the cloud and retrieves them later. In other words, Bob is the same as Alice; but the retrieval is performed at a later time. Alice intends to prevent Eve from obtaining any information about the stored contents in the cloud.

If Alice wants to achieve perfect secrecy similar to the traditional Shannon cipher system, she needs to locally and securely store a separate key for each message that she stores on the cloud and then use that key to retrieve the message from the stored cipher-text. Therefore, she will need the same size of local storage to store securely the keys. This clearly does not benefit from the advantage of offsite massive storage offered by cloud storage; and, thus, is not a practical way to use cloud storage systems. Even assuming that Alice has such a storage capability, Alice would be better off not to store any data on the cloud; but, instead to store the plaintext files locally instead of the keys! Therefore, Shannon's scheme does not work for cloud storage systems in practice.

Using codes like Maximum Distance Separable (MDS) is very common in storage systems [2] due to their repair capabilities. Encoding involves adding one or more bits to the original data to use for error correction, e.g., a checksum. Decoding is the reverse operation. However, certain requirements are needed to secure the applications that use these codes. Authors in [3] studied the security of distributed storage systems with MDS codes. Pawar et al. [4] studied the secrecy capacity of MDS codes. The authors in [5], [6] also proposed security measures for MDS coded storage systems. Shah et al. [7] proposed information-theoretic secure regenerating codes for distributed storage systems. Rawat et al. [8] used Gabidulin codes together with MDS codes to propose optimal locally repairable and secure codes for distributed storage systems. All these references [2]-[9] used an existing forward error correction code and by modifying it, they provided security for distributed storage systems. In the novel methods described below, codes are introduced, which are only designed for security. The idea of separating the design of codes for security and reliability is proposed; and, it is demonstrated that much better results can be achieved.

Kumar et al. [10] have proposed a construction for repairable and secure fountain codes. Reference [10] achieves security by concatenating Gabidulin codes with Repairable Fountain Codes (RFC). Their specific design allows one to use Locally Repairable Fountain Codes (LRFC) for secure repair of the lost data. Unlike [10] which has focused on the security of the repair links using concatenated codes, the novel methods described below provide security for the data storage by only using a novel code design that can achieve perfect secrecy with reduced key size.

Network coding schemes have been shown to be very efficient from a security point of view. Cai and Young [11] showed that network coding can be used to achieve perfect secrecy when network encoded files are sent through multiple paths and only one of the paths is compromised. Bhattad et al. [12] studied the problem of "weakly secure" network coding schemes in which even without perfect secrecy, no meaningful information can be extracted from the network during transfer of data. Subsequent to [12], Kadhe et al. studied the problem of weakly secure storage systems in [13], [14]. Yan et al. also proposed [15], [16] algorithms to achieve weak security, and also studied weakly secure data exchange with generalized Reed Solomon codes. In contrast, the novel method described below designed for cloud storage systems, encode the messages by combining the coding bits and message bits with each other to create the ciphertext. Hence, the ciphertext will not be independent of the message and it is not immediately evident whether the Shannon criteria is valid. Therefore, it might appear that these codes can only achieve weak security—as opposed to perfect security. However, it is shown in subsequent sections that the unique code construction described herein results in perfect secrecy. It is even shown that the unique code construction described herein can efficiently reduce the required key size to achieve such perfect secrecy.

Recently, there has been a lot of interest in studying methods of achieving physical layer security through the use of coding techniques [17]. The authors in [18] have proposed a new scheme to use error control codes for cryptography purposes. In [19], the authors provided physical layer security with a special code design. The authors in [20]-[23] studied different methods for achieving asymptotic perfect secrecy using coding techniques. In [20], they proposed a method for achieving asymptotic perfect secrecy in wireless networks using random coding of cached contents. This method is then extended to include secure content update in [22]. In [23], they proposed new coding schemes which are able to provide asymptotic perfect secrecy and privacy at the same time. Note that these works also relied on specific known forward error correction code. In all prior work in literature, asymptotic perfect secrecy was achieved which required the use of infinite size data in order to achieve perfect secrecy. Clearly, this is not a practical solution.

Later in [24], for the first time, the authors introduced the concept of codes only for security, without any error correction capability, by using sparse vectors to achieve asymptotic perfect secrecy in cloud storage systems. The proposed method in [24] significantly outperforms Advanced Encryption Standard (AES) in terms of reducing computational complexity while providing asymptotic perfect secrecy. That coding scheme [24] has the unique ability of providing asymptotic perfect secrecy with low decoding complexity. The new code for security introduced in [24] still suffered from the problem of achieving perfect secrecy asymptotically which does not make this technique completely secure at less than infinite data size.

2. Overview of Solution

In the techniques developed herein, an answer was sought to the following question. Is it possible to leverage the unity of Alice and Bob in the cloud storage model to achieve perfect secrecy in practice or to rely on storage of a very small amount of local data for keys, or some combination? A solution is presented in which perfect secrecy in clouds can be achieved with much smaller key size than the file size.

Furthermore, a coding for security concept is presented and advantageous codes that can be used for security purposes are defined. The idea of using coding for security purposes is a fairly new topic and recently there has been some interest in using codes for security purposes. Optimality of these codes is defined as their ability to achieve perfect secrecy with minimal key size. It is shown that certain embodiments of the techniques presented below are optimal in this sense.

As opposed to [24], these techniques focus on achieving perfect secrecy instead of merely asymptotic perfect secrecy (achieving perfect secrecy asymptotically as the key size increases). Further, code design is of interest, which can achieve perfect secrecy with reduced key size. As mentioned in the introduction, using Shannon cipher for cloud storage systems does not seem practical due to the need for large key storage. Here is presented a solution to overcome this issue. These techniques provide a practical scheme to achieve perfect secrecy with reduced key storage overhead. This focus on practical aspects of code design makes it suited for use in distributed cloud storage systems.

FIG. 1 is a block diagram that illustrates an example system 100 for producing encoded data that is exposed to the public with complete secrecy and a compact key, according to an embodiment. A public network 110 is used to communicate data among various nodes on the network, such as one or more public data servers, e.g., server 130, and one or more public storage devices, e.g., devices 120*a* and 120*b*, collectively referenced hereinafter as public storage devices 120. On a secure computer system 140 resides some plaintext data 142 that is to be kept secret from public access. In an approach described in more detail below, a compact key encoding/decoding module 150 executes on system 140 to define a compact key 152 and successively encode one or more plain text chunks, e.g., chunks 154*a* and 154*b*, collectively referenced hereinafter as plaintext chunks 154 of the plaintext data 142. The encoded chunks, 156*a* and 156*b*, respectively, are ciphertext that can be safely exposed to the public, such as being communicated over public network 110 or stored in one or more public storage devices 120, without divulging the plaintext chunks 154. In a distributed cloud storage system, the two encoded chunks 156*a* and 156*b* are stored on the same or different public storage devices 120*a* and 120*b*, respectively. A characteristic and advantage of the system 100 is that the size of the compact key 152 is much less than the size of the plaintext data 142 being encoded as chunks 156. After public storage of encoded chunks 156 and secure storage of the compact key set, the plaintext 142 or chunks 154 can be removed from the local machine such as computer system 140.

In some embodiments, the module 150 and compact key set 152 or both reside on another device, such as public data server 130 or trusted third party server 136. In such embodiments, there is a secure channel between the secure computer system 140 and the public data server or the trusted $3^{rd}$ party server 136, such as a virtual private network (VPN), and the public data server or $3^{rd}$ party server 136 is trusted to keep secure the plaintext data 142. In such embodiments, the plaintext 142 or plaintext chunks 154 are transmitted securely to the public data server 130 or trusted $3^{rd}$ party server 136, where the module 150 is executed to use or generate the compact key set to produce the encoded chunks 156, and store those chunks 156 on one or more public storage devices 120.

Although processes, equipment, and data structures are depicted in FIG. 1 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. For example, in some embodiments, two or more encoded chunks 156, such as a group of chunks encoded together, are stored on the same public storage device 120. In some embodiments, each of one or more of the secure computer system 140 or public data server 130 or public storage device 120 is a computer system as described below in reference to FIG. 4, or a chip set as described below in reference to FIG. 5, or a mobile terminal, such as a tablet or cell phone, as described below in reference to FIG. 6, or some combination.

As described in the following sections, perfect security can be achieved with the encoding scheme presented here. In contrast, Shannon perfect secrecy, also known as one-time pad, can only be achieved by using exactly a different key bit for each information bit. This requirement makes the implementation of perfect secrecy impractical in most applications. As described below, some embodiments for security achieve perfect secrecy with only half a bit key per packet or equivalently, one bit key per two packets, regardless of the size of the packet. This surprising result implies that the ratio of key to the ratio of the data can asymptotically go to zero. The coding scheme has been applied to distributed cloud storage systems. Further, optimal code for security is defined and it has been shown that the proposed approach is optimal, at least in some embodiments.

3. Method for Encoding

Figure 2:
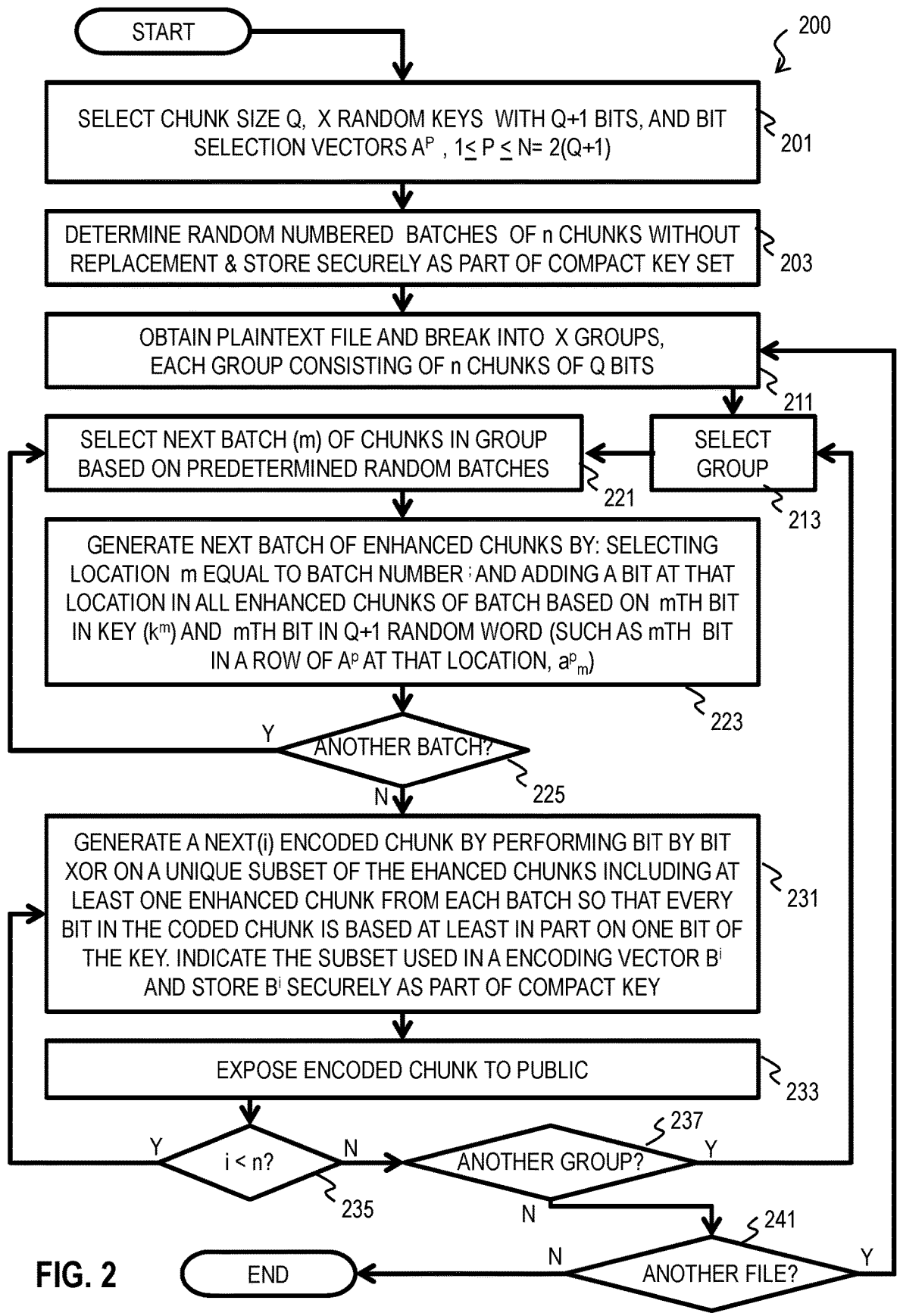
FIG. 2 is a flow diagram that illustrates an example method for producing encoded data with a compact key, according to an embodiment.

FIG. 2 is a flow diagram that illustrates an example method 200 for producing encoded data with a compact key, according to an embodiment. An advantage of this method is perfect or near perfect secrecy. Although steps are depicted in FIG. 2, and in subsequent flowchart FIG. 3, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 201, a number Q of bits is selected as a size for a chunk 154. Because the number of bits encoded per operation is a function of chunk size, there is incentive to make chunk size Q large, and there is no limit on how large Q can be. However, because the complexity of the operation and size of the key set increases with Q, there is an incentive to make Q small. There is no need for Q to be a power of two; but, in some embodiments it is advantageous for Q to be a power of two. A practical range for Q is about 4 to about 10,000, with many embodiments using Q in a range from about 10 to about 1000 (e.g., 8 to 1024 if a power of two is advantageous). A number n of chunks 154 encoded together form a group of size n=2(Q+1) chunks—or 2(Q+1)Q bits. The chunks of one group are expressed by Equation 1a through Equation 1c.

$$F_i = [f_i^1, f_i^2, \ldots, f_i^Q] \quad (1a)$$

$$i = 1, n \quad (1b)$$

$$n = 2(Q+1) \quad (1c)$$

where Q is the number of bits in one chunk, and $f_i^j$=jth bit of chunk i, where j=1, Q. The number X of groups that are used to encode a original plaintext file 142 of size Z bits is then Z/(2(Q+1)Q) rounded up to the next integer. For each group, a random key $\mathcal{K}_x$, x=1, X, each key consisting of Q+1 bits, is also selected during step 201. There is an extra bit because the encoding involves inserting a random bit at a random location. For convenience the subscript x is dropped and the key for the current group is given by Equation 2.

$$\mathcal{K}_X = [k^1, k^2, \ldots k^Q, k^{Q+1}] \quad (2)$$

where Q is the number of bits in one chunk, and m=mth bit of key, m=1, Q+1.

Also, up to n random bit-selection vectors, $A^p$, p=1, n, each of size Q+1, are selected. The same n bit-selection vectors $A^p$ are used for all X groups. The bit-selection vectors are given by Equation 3.

$$A^p = [a_1^p, a_2^p, \ldots a_Q^p, a_{Q+1}^p], p=1, n \quad (3)$$

where Q is the number of bits in one chunk, and $a_m^p$=mth bit of pth bit selection vector $A^p$, where m=1, M (M=Q+1) and so the index m is distinguished from the index j that only goes to Q. In some embodiments, another independently random Q+1 bit vector is used as a supplemental bit-selection vector A' in addition to $A^p$.

During step 201, Q or $\mathcal{K}_x$ or $A^p$ or A', or some combination, are stored securely as parts of a compact key set. For example, in some embodiments, Q, $A^p$ and $\mathcal{K}_x$ are stored on local, physically secured, computer readable memory. In other embodiments, Q, $A^p$ and $\mathcal{K}_x$, or some combination, are generated or stored or both by a trusted service provider, such as a trusted provider of cloud storage using server 130 or a trusted third party using server 136. In some embodiments, only Q and $A^p$ are stored securely during step 201 because $\mathcal{K}_x$ is used only to generate the random bits in the encoded chunks but is not used to decode the encoded chunks. Whatever is stored, by whatever party, constitutes parts of the compact key set for the method. The remaining parts of the compact key are provided by a mapping of chunks to batches and an encoding vector, $\mathcal{B}$, as described below. The number of bits in the compact key set is much less than the number of bits Z in the original plaintext file.

For example, if Q=4, then n=10, the key is a 5-bit random integer, and each $A^p$ is a set of 5-bit integers. For purposes of illustration, it is assumed that the first six bit-selection vectors $A^p$ are given by Table 1.

TABLE 1

Example bit selection vectors.

| | |
|---|---|
| $A^1$ | 10101 |
| $A^2$ | 00111 |
| $A^3$ | 11001 |
| $A^4$ | 11101 |
| $A^5$ | 00101 |
| $A^6$ | 00110 |

In step 203, a random batching of chunks is predetermined to produce a number M of batches, each batch designated $\mathcal{P}m$, m=1, M. Each batch includes two or more chunks. No chunk appears in multiple batches. For example, if each batch is a pair of chunks, M=n/2=Q+1. In some embodiments, two pairs of chunks are further collected into a batch of 4 non-repeating chunks; for which M=n/4. This is accomplished by selecting, for each member, l, (l=1, n/M) of the batch $\mathcal{P}m$, a chunk at random without replacement. The chunk batches are given by Equations 4a through 4c.

$$\mathcal{P}m = \{Pml\}, l = 1, n/M \quad (4a)$$

$$= \{F_{i(m,l)}\}, l = 1, n/M \quad (4b)$$

$$m = 1, M \quad (4c)$$

A mapping between m,l, and the indices i for the n chunks can be placed in a table and stored in the compact key set. Essentially, i is a function of m and l. For the example with Q=4, described above, and batches comprising a pair of chunks, so l=1, 2, an example embodiment of the mapping is that provided in Table 2. In some embodiments, different groups use different mappings between M batches n chunks.

TABLE 2

Example predetermined mapping of n chunks to M = n/2 pairs when n = 10.

| m | l = 1 | l = 2 |
|---|---|---|
| 1 | i = 4 | i = 7 |
| 2 | i = 3 | i = 5 |
| 3 | i = 2 | i = 6 |
| 4 | i = 8 | i = 9 |
| 5 | i = 1 | i = 10 |

The jth bit in the chunk Pml is designated $o_{ml}^j$, and corresponds to the bit $f_{i(m,l)}^j$.

In step 211, a plaintext file is obtained for encoding. In this context, plaintext refers to any collection of bits, such as an image file or text file, for which public exposure reveals information contained in the file. The plaintext file is to be protected from public disclosure, e.g., the plaintext is to be kept secret. It might be generated locally or provided from a physically secure source. However, it is desired to pass the information over a public network without revealing the information, e.g., to store the information using cloud storage on a public network. Therefore, the plaintext is to be encrypted using the encoding scheme presented herein. During step 211, the plaintext file of Z bits is divided into X groups of n chunks of Q bits, n=2(Q+1), i.e., into X=Z/nQ groups of nQ bits. If needed, bits indicating null data are added so that the file size is an integer multiple of nQ bits. In some embodiments, nQ contiguous bits are used in each group. In some embodiments, every Xth bit of the plaintext file is used in each group. In other embodiments, other methods of selecting the nQ bits from the plaintext is used.

In step 213, one group of n chunks is selected for encoding together.

In step 221, the next batch of chunks in the current group is selected. The chunks involved in the batch are based on the predetermined random mapping of chunks into batches, e.g., as mapped using Table 2.

In step 223, a batch of enhanced chunks are generated. Enhanced chunks have an extra random bit added at a random location. Enhanced chunks are represented by Equation 5.

$$Gi = [g_i^1, g_i^2, \ldots, g_i^{Q+1}] \quad (5)$$

The batch $\mathcal{E}m$ of enhanced chunks is expressed using Equation 6a and Equation 6b.

$$\mathcal{E}m = \{Eml\}, \; l = 1, n/M \quad (6a)$$

$$= \{G_{i(m,l)}\}, \; l = 1, n/M \quad (6b)$$

Using the same mapping among i, m and l as above for the batch of chunks. The relation of the $g_i^m$ to the $f_i^j$ and the extra random bit is determined based on the key $\mathcal{K}$ and the bit-selection vectors $A^p$.

For example, in some embodiments, if $a_m^P=0$, then insert $k^m$ (mth bit) from key into the mth bit of an enhanced member of the mth batch, e.g., Em1, and fill rest of bits from the corresponding original member of the batch, e.g., Pm1. Also insert 0 into the mth bit of the other enhanced members of the mth batch, e.g. Em2, and fill rest of bits from the other original members of the batch, e.g., Pm2. Otherwise, if $a_m^P=1$, then insert XOR(1, $k^m$) into the mth bit of a different enhanced member of the batch, e.g., Em2 and fill rest of bits from the corresponding original member, e.g., Pm2, and insert 0 into the mth bit of the remaining enhanced members of the batch, e.g., Em1, and fill rest of bits from the original member of the batch, e.g., Pm1. Here XOR refers to an exclusive OR operation among the bits listed. An exclusive OR returns a value of 1 only when the values of the two bits are different. The combination of $k^m$ and XOR(1, $k^m$) ensures the encoded chunks can be decoded.

In some embodiments, for all chunks in the batch, more than one bit-location is selected for noise insertion. For example, two locations in each chunk of the batch can be selected for noise insertion, such that either two random bits (noise) or two zeros are inserted. However, these locations for different chunks should be non-overlapping with locations selected for other chunks. Also, all the locations of insertion for every chunk in the batch should cover the entire enhanced chunk size (Q+1). Therefore, every encoded chunk bit will include at least one noise bit.

For example, in other embodiments each batch comprises a pair S1 {Em1, Em2} and S2 {Em3, Em4} of pairs (Eml$_1$, Eml$_2$) (i.e., four members total Em1, Em2, Em3 and Em4, so l=1, 4). For describing the resulting enhanced batch, it is useful to define the bit quantities $\alpha$ and $\beta$, given as follows.

$$\alpha_1^p = XOR(a_1^p, k^m) \text{ and } \alpha_3^p = XOR(a_3^p, k^m)$$

$$\beta_{m1}^p = \begin{cases} \alpha_{m1}^p & \text{if } XOR(NOT\; k^m, a_m^p) = 0 \\ 0 & \text{if } XOR(NOT\; k^m, a_m^p) = 1 \end{cases}$$

$$\beta_{m2}^p = \begin{cases} \alpha_1^p & \text{if } XOR(NOT\; k^m, a_m^p) = 1 \\ 0 & \text{if } XOR(NOT\; k^m, a_m^p) = 0 \end{cases}$$

$$\beta_{m3}^p = \begin{cases} 0 & \text{if } XOR(NOT\; k^m, a_m^p) = 0 \\ a_3^p & \text{if } XOR(NOT\; k^m, a_m^p) = 1 \end{cases}$$

$$\beta_{m4}^p = \begin{cases} 0 & \text{if } XOR(NOT\; k^m, a_m^p) = 0 \\ a_3^p & \text{if } XOR(NOT\; k^m, a_m^p) = 1 \end{cases}$$

Then the enhanced batch using bit selection vector $A^p$ is as follows.

$$E_{ml}^p = [o_{ml}^1, \ldots, o_{ml}^{m1-1}, \beta_m^p, o_{ml}^{m1}, \ldots, o_{ml}^Q] \text{ for } l=1,2$$

$$E_{ml}^p = [o_{ml}^1, \ldots, o_{ml}^{m3-1}, \beta_m^p, o_{ml}^{m3}, \ldots, o_{ml}^Q] \text{ for } l=3,4$$

The remaining description is provided assuming each batch comprises one pair of members, and the term pair will be used in place of the word batch. It is understood that a pair is simply one embodiment of a batch. For describing the resulting enhanced pair, it is useful to define the bit quantities $\alpha$ and $\beta$, given by Equation 7a through 7c.

$$\alpha_m^p = XOR(a_m^p, k^m) \quad (7a)$$

$$\beta_{m1}^p = \begin{cases} \alpha_m^p & \text{if } a_m^p = 0 \\ 0 & \text{if } a_m^p = 1 \end{cases} \quad (7b)$$

$$\beta_{m2}^p = \begin{cases} 0 & \text{if } a_m^p = 0 \\ \alpha_m^p & \text{if } a_m^p = 1 \end{cases} \quad (7c)$$

Then the enhanced pair using bit selection vector $A^p$ is given by Equation 8.

$$E_{ml}^p = [o_{ml}^1, \ldots, o_{ml}^{m-1}, \beta_m^p, o_{ml}^m, \ldots, o_{ML}^Q] \quad (8)$$

In step 223, the batch of enhanced chunks $E_{ml}^p$ is produced for batch m according to Equation 8. The mth bit is inserted for all chunks in the mth batch, but the chunks in the mth batch is randomly selected and stored in the mapping between m,l, and the indices i for the n chunks, described above, e.g., using Table 2 for the example embodiment. Which member of the batch gets zero in the mth bit, and which gets a bit in the mth bit based on the key is determined using the vector $A^p$. Obviously, n different enhanced batches could be produced using the same input batch of chunks by using n different $A^p$, p=1, n. In an example embodiment, the first row, $A^1$ is used to select the member of each batch to get zero or the random bit $\alpha_m^p$. In other embodiments, a different row of Ap, such as the $2^{nd}$ or mth row of $A^p$, or the supplemental bit selection vector $A'$, is used to determine which batch member gets the zero and which gets the random bit $\alpha_m^p$.

In step 225, it is determined whether there is another batch of chunks in the group to process. If so, control passes back to step 221 to select the next batch of chunks in the group. Otherwise control passes to step 231. For example, using the example $A^p$ for p=1, i.e., the first row of $A^p$, and mapping of chunks to pairs in table 2, both described above, the resulting enhanced chunks have bits as expressed in Equations 9a through 9j.

$$G1=[f_1^1, f_1^2, f_1^3, f_1^4, \beta_{51}^1] \quad (9a)$$

$$G2=[f_2^1, f_2^2, \beta_{31}^1, f_2^3, f_2^4] \quad (9b)$$

$$G3=[f_3^1, \beta_{21}^1, f_3^2, f_3^3, f_3^4] \quad (9c)$$

$$G4=[\beta_{11}^1, f_4^1, f_4^2, f_4^3, f_4^4] \quad (9d)$$

$$G5=[f_5^1, \beta_{22}^1, f_5^2, f_i^3, f_5^4] \quad (9e)$$

$$G6=[f_6^1, f_6^2, \beta_{32}^{31}, f_6^3, f_6^4] \quad (9f)$$

$$G7=[\beta_{12}^1, f_7^1, f_7^2, f_7^3, f_8^4] \quad (9g)$$

$$G8=[f_8^1, f_8^2, f_8^3, \beta_{41}^1, f_8^4] \quad (9h)$$

$$G9=[f_9^1, f_9^2, f_9^3, \beta_{42}^1, f_9^4] \quad (9i)$$

$$G10=[f_{10}^1, f_{10}^2, f_{10}^3, f_{10}^4, \beta_{52}^1] \quad (9j)$$

The β terms are the bits based on random values. Note that all 40 original bit values (4 per chunk in a group of 10 chunks) are present, along with an extra bit in each chunk having a random value at a certain location. Notice each bit location, from 1 to 5, has a random bit value (β term) in two enhanced chunks (e.g., the first bit location has a β term in enhanced chunks G4 and G7). Those two enhanced chunks were in the same batch (pair) of enhanced chunks.

In step 231 a next encoded chunk is produced by performing an XOR operation on a unique subset of enhanced chunks (Gi). Each subset is selected to include at least one enhanced chunk from each batch to ensure that every location in the encoded chunk has a bit based on a random value (p term). An encoding vector $B^p$ is produced that indicates the subset of enhanced chunks used. $B^p$ has n elements, one for each of the enhanced chunks that might be combined to form one encoded chunk, as expressed in Equation 10.

$$B^p = \{b_i^p\} \; i=1,n \quad (10)$$

The encoding vectors $B^p$ p=1, n (forming the n×n matrix $\mathcal{H}$) are also stored on a physically secure medium as part of the compact key set.

In an example embodiment, during step 231, the bit selection vectors $A^p$ are used to determine which enhanced chunks to use from each pair of enhanced chunks and thus define at least some of the $B^p$ vectors. In this embodiment, one enhanced chunk is included per pair, based on $A^p$, as given by Equation 11a and 11b.

$$\text{If } a_m^p=0, \text{then } b_{i(m,1)}^p=1 \text{ and } b_{i(m,2)}^p=0 \quad (11a)$$

$$\text{If } a_m^p=1, \text{then } b_{i(m,1)}^p=0 \text{ and } b_{i(m,2)}^p=1 \quad (11a)$$

Note that this procedure uses all the bits of $A^p$ from m=1 to m=M for each encoded chunk. Using the example values described above in an example embodiment, the resulting encoding vector $B^1=[0010011101]$.

Also during step 231, the encoding vector is used to combine certain of the enhanced chunks in an exclusive OR operation to produce an encoded chunk CP with each bit affected by a corresponding bit in the key K. The combination is given in Equation 12.

$$C^p = \text{XOR}(b_i^p G_i) \; i=1,n \quad (12)$$

For example, using $B^1$, the encoded chunk C1=XOR(G3, G6,G7,G8,G10). As described in more detail below In step 233, this encoded chunk is then safely exposed to the public, such as storing in distributed cloud storage, without revealing the information in the plaintext. For example, the encoded chunk is stored on public storage device 120a.

To retrieve the information in the plaintext, this encoded chuck is used in combination with multiple independently encoded chucks for the same group. For each group there are exactly n such encoded chunks, e.g., stored on the same or different public storage devices 120. The n encoded chunks can be used with the compact key set to reconstruct the original plaintext for the group. Thus, in step 235, it is determined whether the number of encoded chunks so far produced, e.g., i, is less than n. If so, control passes back to step 231 to generate the next encoded chunk. If not, then a sufficient number of encoded chunks have been produced for decoding; and control passes to step 237.

In step 237, it is determined if there is another group of chunks in the original plaintext file to encode. If so, then control passes back to step 213 to select the next group. If not, then the entire original plaintext file has been encoded; and, control passes to step 241.

In step 241, it is determined if there is another plaintext file to encode. If so, then control passes back to step 211 to obtain the next plaintext file, and break it up into a new set of groups. If not, then all plaintext files have been encoded; and, the process ends.

In some embodiments, the encoded chunks are not exposed to public devices in step 233 until several or all of the encoded chunks for the current group, or for multiple or all groups, are produced. Thus, in various embodiments, step 233 is moved to occur after step 235 and before step 237, or to after step 237 and before step 241, or to after step 241.

For decoding, n encoded chunks produced in the loop of steps 231 and 235 are desired that are linearly independent of each other. To ensure that is the case, n linearly independent encoding vectors $B^p$ are desired. This cannot be assured based on the random bit selection vectors $A^p$ used to generate the encoding vectors. Assume that, using steps 231 and 235 above, n encoding vectors are generated such that the space spanned by vectors $B^1 \ldots B^n$ has a rank r<n. An encoding matrix $\mathcal{H}$ is generated by an n×n matrix such that each row of this matrix is one of the encoding vectors $B^i$. In this scenario, the encoding rank of this matrix is increased to allow decoding. To do so, encoding vectors for which $b_{i(m,1)}^p$ and $b_{i(m,2)}^p$ are both equal to one simultaneously are also considered. This amounts to preforming an exclusive OR with an existing $C^p$ and another Gp not already included in the $C^p$. This process still guarantees that a random bit is included in each bit of the encoded chunk. Since in this case both files are added, then a new form of random encoding vector is introduced which results in increased rank.

For example, using the values described above for an example embodiment, for p=1, 6 the encoding vector expressed in Equations 13a through Equation 13f are produced.

$$B^1=[0010011101] \quad (13a)$$

$$B^2=[0011010011] \quad (13b)$$

$$B^3=[0100101101] \quad (13c)$$

$$B^4=[0000111101] \quad (13d)$$

$$B^5 = [0011010101] \quad (13e)$$

$$B^6 = [1011010010] \quad (13f)$$

And the corresponding 6 encoded chunks are produced by the operations expressed in Equation 14a through Equation 14f.

$$C^1 = \text{XOR}(G3,G6,G7,G8,G10) \quad (14a)$$

$$C^2 = \text{XOR}(G3,G4,G6,G9,G10) \quad (14b)$$

$$C^3 = \text{XOR}(G2,G5,G7,G8,G10) \quad (14c)$$

$$C^4 = \text{XOR}(G5,G6,G7,G8,G10) \quad (14d)$$

$$C^5 = \text{XOR}(G3,G4,G6,G8,G10) \quad (14e)$$

$$C^6 = \text{XOR}(G1,G3,G4,G6,G9) \quad (14f)$$

All of these vectors are linearly independent of each other in the binary field. However, it is not possible to create more independent vectors using new $B^p$ vectors with five non-zero elements. It is desirable to increase the rank of all vectors selected to 10 to be able to get a full rank basis for decoding.

To increase the rank, in one embodiment, two new enhanced chunks are included in the encoding process. For example, a pair, such as m=5 pair{G1,G10}, is chosen; and both of the enhanced chunks files G1 and G10 are included in the encoding. By this construction, a random bit is still being added to the fifth location of one of the encoded files. This is equivalent to $C^7 = \text{XOR}(C^6, G10)$ and corresponds to $b^7 = [1011010011]$. Similarly all ten encoded chunks $C^p$ are filled out with a final four chunks, p=7, 10, as given in Equation 14g to Equation 14j.

$$C^7 = \text{XOR}(C^6, G10) \quad (14g)$$

$$C^8 = \text{XOR}(G2, C^7) \quad (14h)$$

$$C^9 = \text{XOR}(C^8, G5) \quad (14i)$$

$$C^{10} = \text{XOR}(C^5, G9) \quad (14j)$$

These correspond to encoding vectors $B^p$, p=7, 10, as given in Equation 13g to Equation 13j.

$$b^7 = [1011010011] \quad (13g)$$

$$b^8 = [1111010011] \quad (13h)$$

$$b^9 = [1111110011] \quad (13i)$$

$$b^{10} = [0011010111] \quad (13j)$$

This choice of full rank vectors gives rise to a full rank encoding matrix $\mathcal{H} = B^p$ for $\mathcal{H}$ p=1, n that are linearly independent and a full rank encoded group $C = C^p$ for p=1, n that are also linearly independent and based on the enhanced chunks $\mathcal{G} = Gi$, i=1, n. The resulting encoded chunks scheme can be decoded by solving the linear equations in Galois Field 2. The forward transformation is given by Equation 15a.

$$C = \mathcal{H} \mathcal{G} \quad (15a)$$

And the decoding is performed using $\mathcal{H}^{-1}$, the inverse of $\mathcal{H}$, as given by Equation 15b.

$$\mathcal{G} = \mathcal{H}^{-1} C \quad (15b)$$

The rows in $\mathcal{G}$ are associated with a batch number using the mapping, e.g., in Table 2; and the batch number indicates the position of the inserted bit, i.e., batch m had a bit inserted in position m. The mth bit is removed from the rows corresponding to batch m, which are $G_{i(m,l)}$, l=1, n/M. In this construction, all the encoded chunks are uniformly distributed and no information about the original chunks can be extracted from the newly encoded chunks. Further, note that the choice of linearly independent vectors is not unique and there are many ways of constructing 10 linearly independent vectors.

The amount of storage for the compact key set in the above method is determined and compares favorably with that of Shannon. It is assumed that the same encoding vectors $B^i$ for $1 \le i \le n$ are used to encode the chunks in all groups of n chunks. More specifically, assume that there are X groups named as $\mathcal{F}_1, \ldots, \mathcal{F}_X$. Each group has n=2(Q+1) chunks, and uses the same encoding vectors $B^i$ to encode these files as any of the other group. The set of encoding vectors is composed of n vectors each with n bits. Therefore, the set of all encoding vectors $B^i$ for $1 \le i \le n$ can be represented by $n^2 = 4(Q+1)^2$ bits. This serves a function similar to an encryption password and remains the same throughout the whole encoding process. In some embodiments, each group uses a separate mapping between batches and individual enhanced chunks (as depicted for example above in Table 2)); but, in other embodiments, the compact key set can be even smaller if the same mapping (e.g., as depicted in Table 2) is used in each group. In the latter embodiments, the storage requirements are fixed no matter how many groups there are; and, in the limit of large number of groups, this mapping contributes negligibly to the overall storage requirements. For purposes of estimating storage requirements for various embodiments, it is assumed that a different key is also stored for each group. Then, for X groups, each containing n=2(Q+1) chunks with Q bits and a key with Q+1 bits, a total storage overhead of $4(Q+1)^2 + X(Q+1)$ bits is used for the compact keys.

If Shannon one-time-pad is used, a total of X(2(Q+1))Q bits are required to achieve perfect secrecy. The ratio R of these two values is given by Equation 15c.

$$R = \frac{4(Q+1)^2 + X(Q+1)}{X(2(Q+1))Q} = \frac{X + 4Q + 4}{2XQ} \quad (15c)$$

This ratio is much less than 1 which the ratio would be for a Shannon cipher. In practical systems, the number of chunks stored in a cloud storage system can be very large and asymptotically goes to infinity, i.e., $X \to \infty$, and the ratio is given by Equation 15d.

$$\lim_{X \to \infty} R = \frac{1}{2Q} \quad (15d)$$

This result implies that for every two chunks each one with Q bits of information in Shannon cipher, the encoding method 200 described herein only requires one bit while both techniques achieve perfect secrecy. This is equivalent of half a bit of compact key set for every chunk of size Q bits!

This approach achieves arguably perfect secrecy with minimum key size requirements for distributed cloud storage system and other applications. To the best of the author's knowledge, this is the first method that provides perfect secrecy as defined by Shannon with only half a bit per each chunk regardless of the size of the chunk. The result implies that the ratio of compact key set size to the ratio of data file approaches zero asymptotically as the size of the data file increases. This surprising result provides a practical technique for storing data in distributed cloud storage systems as an alternative to encryption. Unlike encryption that provides computational security as long as the adversary has limited computational capability, information theoretic perfect security cannot be decoded regardless of the computational capability of the adversary.

4. Method for Decoding

Figure 3:
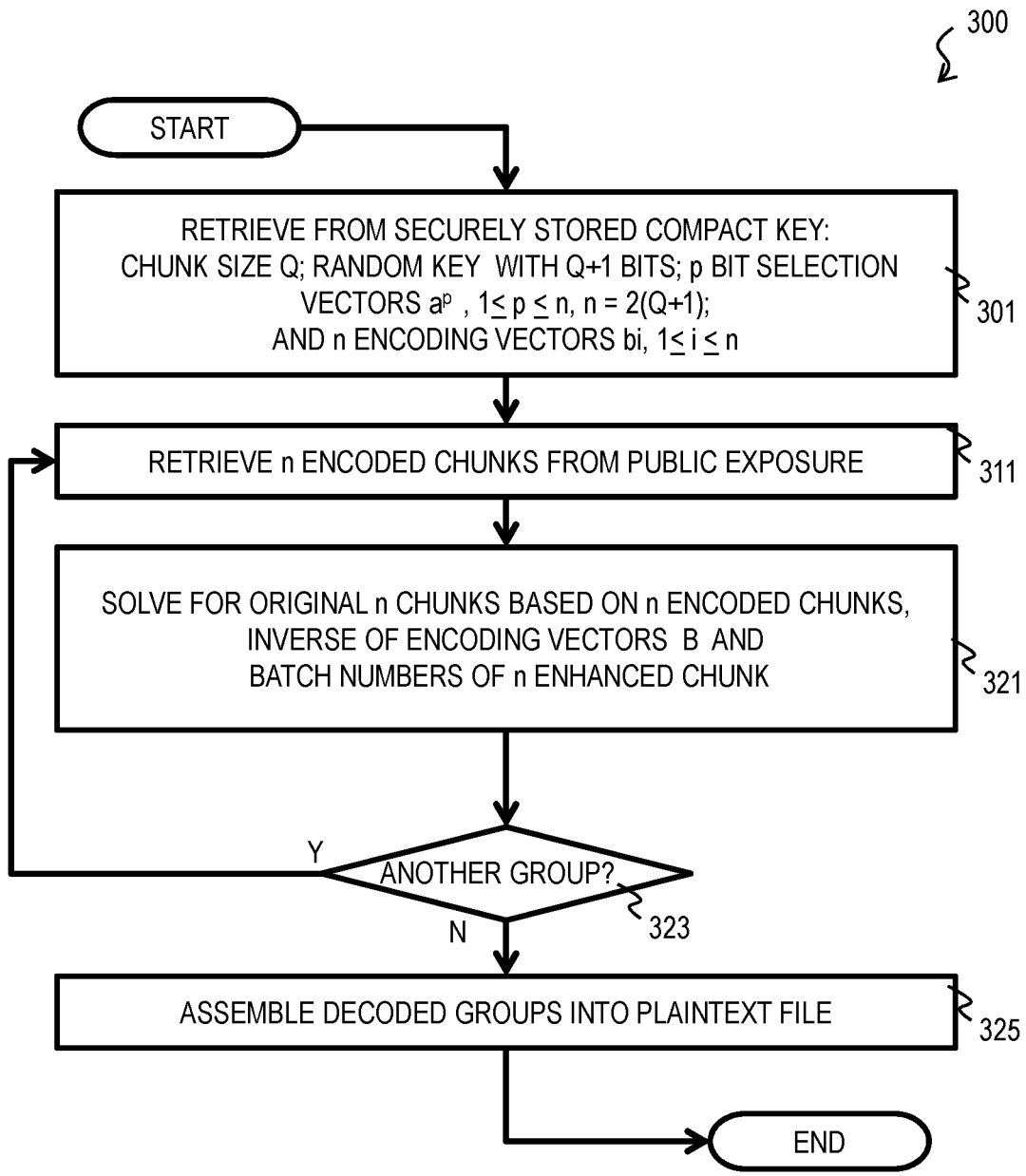
FIG. 3 is a flow diagram that illustrates an example method for decoding encoded data with a compact key, according to an embodiment.

FIG. 3 is a flow diagram that illustrates an example method for decoding encoded data with a compact key, according to an embodiment. In step 301, the compact key set is retrieved from secure storage. The compact key set includes the value of Q, the mapping from chunks to batches and the encoding vectors $B^p$. In some embodiments, the compact key set also includes the values of the key $\mathcal{K}$ for each group, and the bit selection vectors $A^p$. In step 311, for each group, $n=2(Q+1)$ encoded chunks are retrieved from exposure to the public, e.g., from cloud storage on public storage devices 120.

In step 321 the original n chunks are determined based on the retrieved encoded chunks and the compact key set, as described above using Equation 15b to get the enhanced chunks followed by removal of the mth bit from the enhanced chunks in the mth batch to get the original chunks.

In step 323, it is determined whether there is another group associated with the plaintext file to be reconstructed. If so, then control passes back to step 311 to retrieve the encoded chunks for the next group. If not, all groups have been decoded; and, control passes to step 324. In step 324 the plaintext file is reconstructed based on the decoded groups, e.g., by assembling contiguous groups in order, or interleaving groups representing every Xth bit, where $X=Z/(2(Q+1)Q)$ and Z is the size of the plaintext file to be reconstructed.

5. Theory of Operation

To further understand the operation of the methods and the modules that implement them, the following theorems and proofs are presented. Embodiments of the invention are not limited by the accuracy or completeness of the material presented in this section. The following theorem proves that vectors can be added to span the space as done for Equations 14g through 14j.

5.1 Full rank n set of encoding vectors.

Theorem 1.

Let $B^p=\{b_i^p\}$ i=1, n and let $b_{2j-1}^p$ and $b_{2j}^p$ belong to the same pair, as defined above. Without loss of generality and to simply the presentation of the theorem, it is assumed that the chunks $F_{2j-1}$ and $F_{2j}$ are grouped together for all j=1, Q+1. The set of all such n-dimensional vectors is full rank and spans the n-dimensional space.

Proof.

This theorem can be proved by induction on Q. For Q=1, it is not difficult to verify that the vectors (0, 1, 0, 1), (1, 0, 1, 0), (1, 0, 0, 1), (0, 1, 1, 1) can be used for the encoding construction. Further, these four vectors span the 4-dimensional vector space. Therefore the set of all vectors using the encoding construction for Q=1 will be full rank.

Now, as the induction hypothesis, it is assumed that the theorem holds for Q and it is desired to show that it will also hold for Q+1. Assume that the set of all vectors $B^p$ spans the n-dimensional vector space. We choose n vectors $B^1$, $B^2$, ... $B^n$ that are linearly independent and span the n dimensional vector space. Using these vectors, a new set of n vectors of length n+2 is constructed with at least a one at either 2Q+3 or 2(Q+2) position and also by in the ith position for $1 \le i \le 2Q+2$. In other words, the new n constructed vectors will each look like Equation 16

$$B_{n+2}^p = (b_1^p, b_2^p, \ldots, b_n^p, \theta_{n+1}^p, \theta_{n+2}^p) \text{ for } p=1,n \quad (16)$$

where $\theta_{n+1}^p$ and $\theta_{n+2}^p$ are not simultaneously zero. Now there are n linearly independent vectors of length n+2 labeled as $B_{n+2}^1, B_{n+2}^2, \ldots, B_{n+2}^n$. If two more linearly independent vectors can be added to this set of vectors, then we have created a set of n+2 linearly independent vectors which can span the (n+2)-dimensional vector space which proves the theorem.

To create these two vectors, we choose the original vector B1and generate two vectors by adding two new terms to each as expressed in Equation 17 and 18.

$$B_{n+2}^{n+1} = (b_1^1, b_2^2, \ldots, b_n^1, \theta_{n=1}^{n+1}, \theta_{n+2}^{n+1}) \quad (17)$$

$$B_{n+2}^{n+2} = (b_1^1, b_2^2, \ldots, b_n^1, \theta_{n=1}^{n+2}, \theta_{n+2}^{n+2}) \quad (18)$$

where the two pairs $(\theta_{n+1}^{n+1}, \theta_{n+2}^{n+1}) \ne (\theta_{n+1}^{n+2}, \theta_{n+2}^{n+2})$ and none of the pairs has simultaneous zeros, e.g., $(\theta_{n+1}^{n+1}, \theta_{n+2}^{n+1}) \ne (0,0)$. Also, neither of these two pairs is equal to the pair $(\theta_{n+1}^1, \theta_{n+2}^1)$.

This condition assures that the three vectors of length n+2 that are generated from the original vector $B^1$ are different. It only remains to show that the vectors $B_{n+2}^{n+1}$ and $B_{n+2}^{n+2}$ with vectors expressed in Equation 16 span the (n+2)-dimensional vector space. It is obvious that each one of these vectors $B_{n+2}^{n+1}$ and $B_{n+2}^{n+2}$ is by itself independent of all vectors in Equation 16. However, it is not readily clear that if both of the two vectors are added simultaneously, they will increase the dimension by 2. If this condition is not satisfied, that is equivalent of saying that n+1 of these vectors can span the remaining vector.

$$B_{n+2}^{n+1} = XOR(d_i B_{n+2}^i, i=1,n) \oplus B_{n+2}^{n+2} \quad (19)$$

where coefficients $d_i$ can be either zero or one and the symbol $\oplus$ indicates the XOR operation. Equation 19 can be rewritten as Equation 20.

$$B_{n+2}^{n+1} \oplus B_{n+2}^{n+2} = XOR(d_i B_{n+2}^i, i=1,n) \quad (20)$$

However, by construction of the two new vectors, it is clear that $bB_{n+2}^{n+1} \oplus B_{n+2}^{n+2} = (0, 0, \ldots, 0, \theta_{n+1}^{n+1} \oplus \theta_{n+1}^{n+2}, \theta_{n+2}^{n+2} \oplus \theta_{n+2}^{n+2})$. Equation 20 implies that the first n vectors of length n+2 can be added with non-zero coefficients $d_i$ such that their summation adds up to all zero vector for the first n elements of these vectors. This is a clear contradiction that these vectors are linearly independent based on the induction assumption. This implies that the two new added vectors create n+2 vectors that can span n+2-dimensional vector space. Q.E.D.

Theorem 1 proves that a set of all n dimensional random vectors that are not simultaneously zero in locations i=2j−1 and i=2j for all j=1, 2, ..., Q+1 spans the whole n-dimensional space; but, this theorem does not provide any algorithm to create such encoding vectors.

To complete this analysis, a greedy algorithm is proposed in Table 3 to find a full rank encoding basis. The methods described above implement this algorithm. To do so, let $\mathcal{B}$ denote the set of all vectors that are not simultaneously zero at positions m1 and m2 of the same pair m for all pair m=1, 2, ..., Q+1. The algorithm describes how to generate these vectors. Note that in practice, this Table 3 algorithm is used in some embodiments to create the full rank encoding matrix $B^i$ i=1, n and then use that to create the encoded chunks as described earlier.

TABLE 3

Algorithm for finding a full rank encoding basis

| sequence | operation | comment |
|---|---|---|
| 1 | n ← 2(Q+1) | Load value of n based on Q as dimension of encoding vectors C |
| 2 | $\mathcal{B}$ ← all vectors that are not zero in both bits of pair | |
| 3 | $B^p$, p=1, n ← encoding vectors using Equations 11a and 11b | Puts a 0 in one bit of pair and a 1 in the other |
| 4 | H ← linearly independent vectors from $B^p$ | H will develop into full rank encoding matrix such as described in Equations 13a through 13j. |
| 5 | r ← rank(H) | |
| 6 | WHILE r < n DO steps 7 to 9 | |
| 7 | v ← a random vector from $\mathcal{B} - B^p$ | |
| 8 | H ← [H, v] | Update encoding matrix |
| 9 | r ← rank(H) | Update rank |
| 10 | RETURN H | H now has rank n |

5.2 Secrecy.

In this subsection, it is proved that the encoding method described can provide perfect secrecy. To prove this, the Crypto lemma [25] is used to show that each bit of the coded file constructed in Equation 12 is uniformly distributed.

Lemma 1. (Crypto lemma) Let (D, +) be a compact abelian group with group operation +, and let U=V+W, where V and W are random variables over D, and W is independent of V and uniform over D. Then U is independent of V and uniform over D.

Notice that based on the construction of encoded chunks in Equation 12, exactly one chunk in construction of the encoded chunks is selected in each bit location m such that it contains a random bit from key $\mathcal{K}$ in that location. Since XOR encoding is used, Crypto lemma can be used to prove that the distribution of the bit in the m location is uniform.

Theorem 2.

The bits of each encoded chunk $C^i$ are randomly and uniformly distributed and are independent of any of the encoding chunks Fk.

Proof.

Denote the jth bit of $C^i$ by $c_j^i$. It will be shown that this bit is distributed with uniform probability. According to Equation 12, $c_j^i$ can be written as expressed in Equation 21a through Equation 21c $$c_j^i = XOR(b_i^p g_i^j) i=1,n \tag{21a}$$

When i=j the random bit is encountered, so $$= \alpha_j^i \oplus XOR(b_i^p f_i^j) i=1,n \text{ and } i \neq j \tag{21b}$$

Substituting from Equation 7a $$= a_j^i \oplus k^j \oplus XOR(b_i^p f_i^j) i=1,n \text{ and } i \neq j \tag{21c}$$

Since the random bit k is selected uniformly, αj can be equal to 0 or 1 with equal probability. Applying Crypto lemma to the binary field with the XOR operation shows that then the jth bit of $C^i$ denoted by $c_j^i$ is independent of the bits of the original chunks. Aggregating over all the bits of the encoded chunk, it can be deduced that the encoded chunk $C^i$ is independent of any of the original chunks and it is randomly and uniformly distributed. Q.E.D.

Using the construction described above, a single Q+1 bit key $\mathcal{K}$ is used for each group of n=2(Q+1) enhanced chunks Ei each with Q+1 bits. Although the same selection vector A is used for different groups of n chunks, in the following it is proved that this does not cause a problem.

Theorem 3.

The keys used for any group of n files are uniformly distributed and independent of each other.

Proof. To prove this, notice from Equation 21c that for jth bit of the encoded chunk $C^i$, i.e. $c_j^i$, a random key bit $\alpha_j^i = a_j^i \oplus k^j$ is used for encryption. One part of this key, i.e. $k^j$ comes from the random uniform key K that is unique to each group of n chunks and some part of this key comes from the random bit selection vector $A^i$, i.e. $a_j^i$. This two-step randomness is a basis for creating uniform and independent compact key sets used for each group of n chunks. Since each encoded bit in the bit selection vector is uniformly probable to be 0 or 1, even if the same random bit $a_j^i$ is used multiple times and could leak information on its own, applying Crypto lemma to Equation 7a, $\alpha_j^i = XOR(a_j^i, k^m) = a_j^i \oplus k^j$ we can prove that the uniform distribution of $a_j^i$ and $k^j$ are enough to prove that the key bit $\alpha_j^i$ will be uniformly distributed.

To prove that the keys are independent of each other, consider the $j^{th}$ bit of two different encoded keys. Let $\alpha_j^1 \oplus k_1^j$ and $\alpha_j^2 = a_j^i \oplus k_2^j$ represent these key bits. These bits are created by XOR operation between random bits $k_1^j$ and $k_2^j$ and the bit selection bit $a_j^i$ which is common in both of them. Using the properties of XOR function, we can write $a_j^i = \alpha_j^1 \oplus k_1^j = \alpha_j^2 \oplus k_2^j$ which results in Equation 22.

$$\alpha_j^2 = \alpha_j^1 \oplus k_1^j \oplus k_2^j \tag{22}$$

Since $k_1^j$ and $k_2^j$ are random uniform bits, $k_1^j \oplus k_2^j$ will be distributed randomly and uniformly. Applying Crypto lemma to Equation 21 proves that $a_j^1$ and $a_j^2$ will be independent of each other. This proves that the $j^{th}$ bit of the keys are independent of each other, even though a unique entry of the bit selection vector contributes in creating this bit. Similarly, all the bits of the keys are independent of each other and this proves the theorem. Q.E.D.

Theorems 2 and 3 together prove that no information about the original message can be deduced from the encoded messages and therefore perfect secrecy is achievable. Notice that this construction has the property that the elements of the n=2(Q+1) dimensional encoding vector are divided into Q+1 pairs of vectors each with two elements such that these two elements cannot be equal to zero at the same time. Without loss of generality, it is assumed that for the encoding vector $B^i = (b_1^i, b_2^i, \ldots, b_n^i)$ where n=2(Q+1), the bits $b_j^i$ and $b_{j+Q+1}^i$ cannot be zero simultaneously.

5.3 Optimality of Coding for Security

In this subsection, a metric for optimal coding for security is defined and the optimality of the encoding scheme presented here is determined based on this metric.

Definition 1.

A coding scheme designed for security is said to be optimal if it can achieve perfect secrecy and it requires at most one bit per each message regardless of the size of the message. In other words, the ratio of key size to message size goes asymptotically to zero when the message size tends to infinity.

Theorems 2 and 3 clearly prove that the presented encoding scheme achieves perfect secrecy. Further, Equation 15d demonstrates that when Q goes to infinity, the ratio R tends to zero. This low overhead is achieved at the expense of increasing encoding and decoding computational complexities. In practical systems, this overhead can be very small with reasonable computational complexity.

6. Computational Hardware Overview

Figure 4:
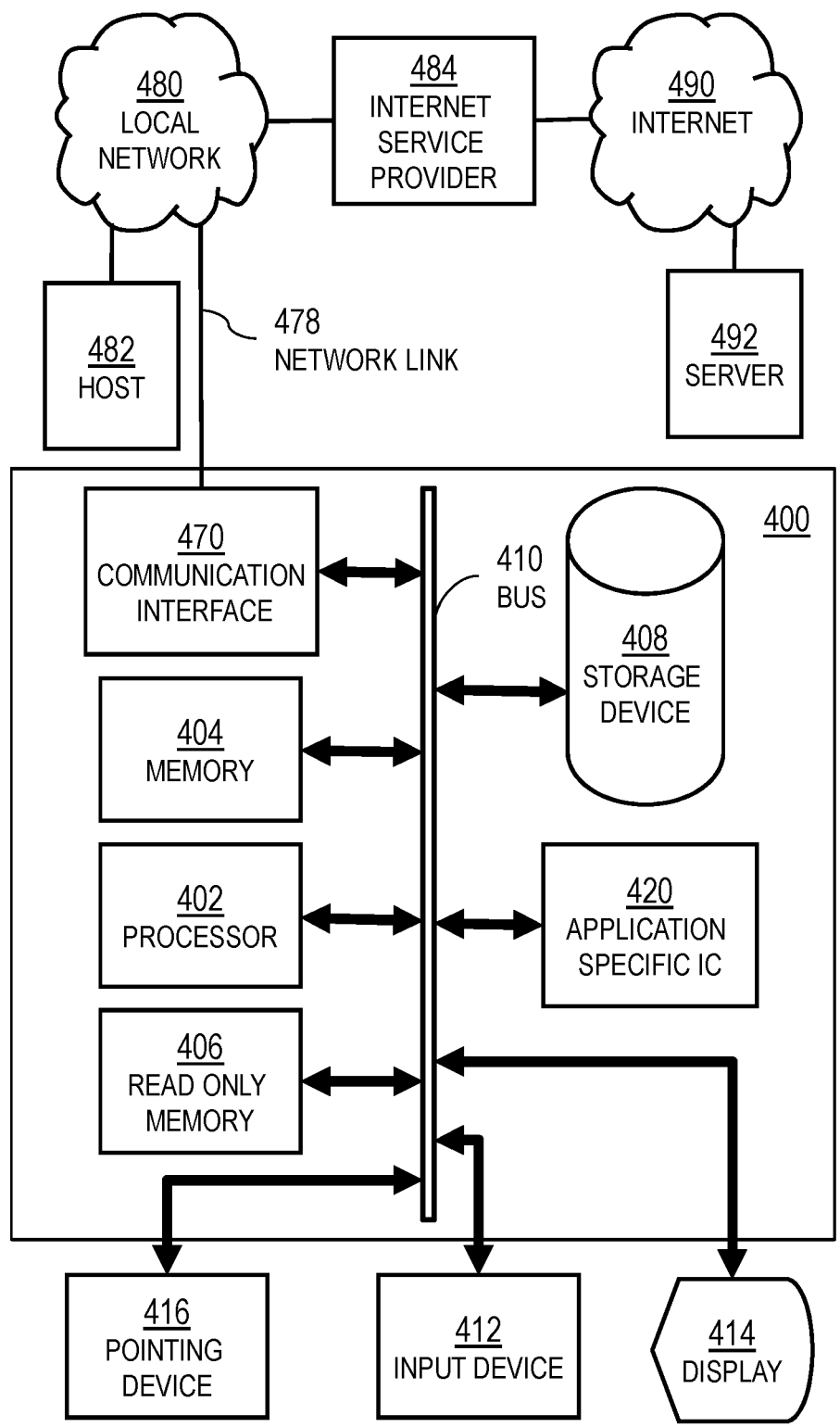
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 400, or a portion thereof, constitutes a means for performing one or more steps of one or more methods described herein.

A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitutes computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 470 sends and receives electrical, acoustic or electromagnetic signals, including infrared and optical signals, that carry information streams, such as digital data.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 402, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 402, except for carrier waves and other signals.

Logic encoded in one or more tangible media includes one or both of processor instructions on a computer-readable storage media and special purpose hardware, such as ASIC 420.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 478 and other networks through communications interface 470, carry information to and from computer system 400. Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other non-volatile storage for later execution, or both. In this manner, computer system 400 may obtain application program code in the form of a signal on a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to a signal on an infra-red a carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

Figure 5:
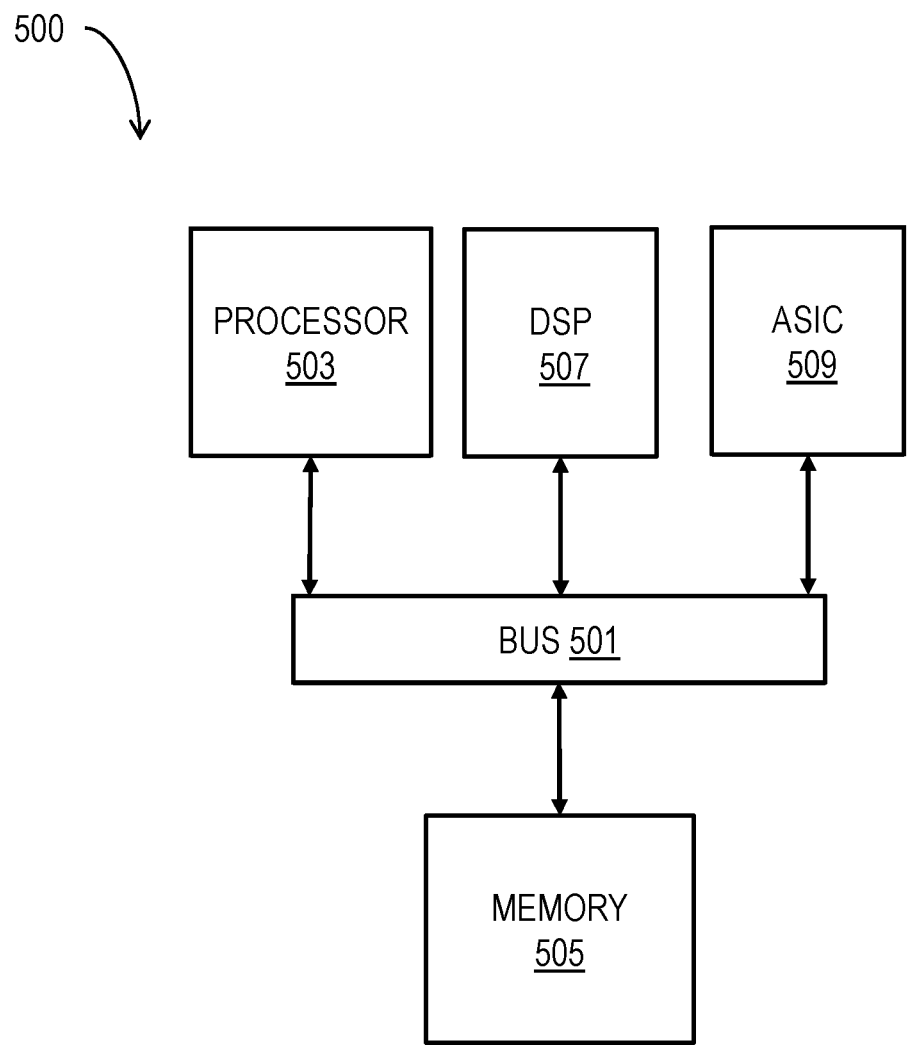
FIG. 5 illustrates a chip set upon which an embodiment of the invention may be implemented.

FIG. 5 illustrates a chip set 500 upon which an embodiment of the invention may be implemented. Chip set 500 is programmed to perform one or more steps of a method described herein and includes, for instance, the processor and memory components described with respect to FIG. 4 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 500, or a portion thereof, constitutes a means for performing one or more steps of a method described herein.

In one embodiment, the chip set 500 includes a communication mechanism such as a bus 501 for passing information among the components of the chip set 500. A processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 503 and accompanying components have connectivity to the memory 505 via the bus 501. The memory 505 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 505 also stores the data associated with or generated by the execution of one or more steps of the methods described herein.

Figure 6:
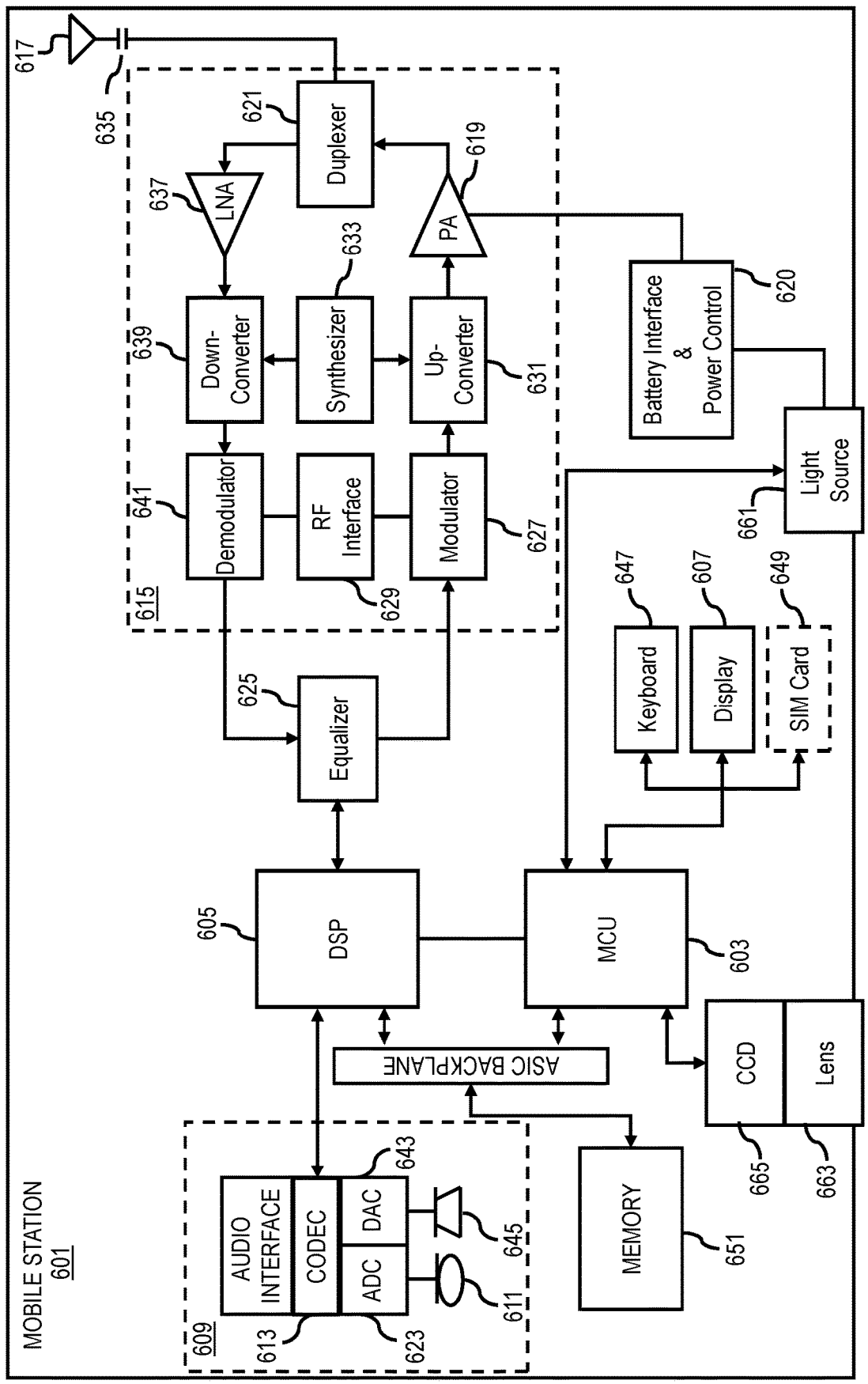
FIG. 6 is a diagram of exemplary components of a mobile terminal (e.g., cell phone handset) for communications, which is capable of operating in the system of FIG. 1, according to one embodiment.

FIG. 6 is a diagram of exemplary components of a mobile terminal 600 (e.g., cell phone handset) for communications, which is capable of operating in the system of FIG. 1, according to one embodiment. In some embodiments, mobile terminal 601, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 603, a Digital Signal Processor (DSP) 605, and a receiver/transmitter unit including a microphone gain control unit and a speaker gain control unit. A main display unit 607 provides a display to the user in support of various applications and mobile terminal functions that perform or support the steps as described herein. The display 607 includes display circuitry configured to display at least a portion of a user interface of the mobile terminal (e.g., mobile telephone). Additionally, the display 607 and display circuitry are configured to facilitate user control of at least some functions of the mobile terminal. An audio function circuitry 609 includes a microphone 611 and microphone amplifier that amplifies the speech signal output from the microphone 611. The amplified speech signal output from the microphone 611 is fed to a coder/decoder (CODEC) 613.

A radio section 615 amplifies power and converts frequency in order to communicate with a base station, which is included in a mobile communication system, via antenna 617. The power amplifier (PA) 619 and the transmitter/modulation circuitry are operationally responsive to the MCU 603, with an output from the PA 619 coupled to the duplexer 621 or circulator or antenna switch, as known in the art. The PA 619 also couples to a battery interface and power control unit 620.

In use, a user of mobile terminal 601 speaks into the microphone 611 and his or her voice along with any detected background noise is converted into an analog voltage. The analog voltage is then converted into a digital signal through the Analog to Digital Converter (ADC) 623. The control unit 603 routes the digital signal into the DSP 605 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 625 for compensation of any frequency-dependent impairments that occur during transmission though the air such as phase and amplitude distortion. After equalizing the bit stream, the modulator 627 combines the signal with a RF signal generated in the RF interface 629. The modulator 627 generates a sine wave by way of frequency or phase modulation. In order to prepare the signal for transmission, an up-converter 631 combines the sine wave output from the modulator 627 with another sine wave generated by a synthesizer 633 to achieve the desired frequency of transmission. The signal is then sent through a PA 619 to increase the signal to an appropriate power level. In practical systems, the PA 619 acts as a variable gain amplifier whose gain is controlled by the DSP 605 from information received from a network base station. The signal is then filtered within the duplexer 621 and optionally sent to an antenna coupler 635 to match impedances to provide maximum power transfer. Finally, the signal is transmitted via antenna 617 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 601 are received via antenna 617 and immediately amplified by a low noise amplifier (LNA) 637. A down-converter 639 lowers the carrier frequency while the demodulator 641 strips away the RF leaving only a digital bit stream. The signal then goes through the equalizer 625 and is processed by the DSP 605. A Digital to Analog Converter (DAC) 643 converts the signal and the resulting output is transmitted to the user through the speaker 645, all under control of a Main Control Unit (MCU) 603 which can be implemented as a Central Processing Unit (CPU) (not shown).

The MCU 603 receives various signals including input signals from the keyboard 647. The keyboard 647 and/or the MCU 603 in combination with other user input components (e.g., the microphone 611) comprise a user interface circuitry for managing user input. The MCU 603 runs a user interface software to facilitate user control of at least some functions of the mobile terminal 601 as described herein. The MCU 603 also delivers a display command and a switch command to the display 607 and to the speech output switching controller, respectively. Further, the MCU 603 exchanges information with the DSP 605 and can access an optionally incorporated SIM card 649 and a memory 651. In addition, the MCU 603 executes various control functions required of the terminal. The DSP 605 may, depending upon the implementation, perform any of a variety of conventional digital processing functions on the voice signals. Additionally, DSP 605 determines the background noise level of the local environment from the signals detected by microphone 611 and sets the gain of microphone 611 to a level selected to compensate for the natural tendency of the user of the mobile terminal 601.

The CODEC 613 includes the ADC 623 and DAC 643. The memory 651 stores various data including call incoming tone data and is capable of storing other data including music data received via, e.g., the global Internet. The software module could reside in RAM memory, flash memory, registers, or any other form of writable storage medium known in the art. The memory device 651 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 649 carries, for instance, important information, such as the cellular phone number, the carrier supplying service, subscription details, and security information. The SIM card 649 serves primarily to identify the mobile terminal 601 on a radio network. The card 649 also contains a memory for storing a personal telephone number registry, text messages, and user specific mobile terminal settings.

In some embodiments, the mobile terminal 601 includes a digital camera comprising an array of optical detectors, such as charge coupled device (CCD) array 665. The output of the array is image data that is transferred to the MCU for further processing or storage in the memory 651 or both. In the illustrated embodiment, the light impinges on the optical array through a lens 663, such as a pin-hole lens or a material lens made of an optical grade glass or plastic material. In the illustrated embodiment, the mobile terminal 601 includes a light source 661, such as a LED to illuminate a subject for capture by the optical array, e.g., CCD 665. The light source is powered by the battery interface and power control module 620 and controlled by the MCU 603 based on instructions stored or loaded into the MCU 603.

7. Alternatives, Extensions and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

8. References

1. Claude E Shannon. Communication theory of secrecy systems. Bell Labs Technical Journal, 28(4):656-715, 1949.
2. Alexandros G Dimakis, P Brighten Godfrey, Yunnan Wu, Martin J Wainwright, and Kannan Ramchandran. Network coding for distributed storage systems. IEEE Transactions on Information Theory, 56(9):4539-4551, 2010.
3. Theodoros K Dikaliotis, Alexandros G Dimakis, and Tracey Ho. Se-curity in distributed storage systems by communicating a logarithmic number of bits. In Information Theory Proceedings (ISIT), 2010 IEEE International Symposium on, pages 1948-1952.IEEE, 2010.
4. Sameer Pawar, Salim El Rouayheb, and Kannan Ramchandran. On secure distributed data storage under repair dynamics. In Information Theory Proceedings (ISIT), 2010 IEEE International Symposium on, pages 2543-2547. IEEE, 2010.
5. Sameer Pawar, Salim El Rouayheb, and Kannan Ramchandran. Securing dynamic distributed storage systems against eavesdropping and adver-sarial attacks. IEEE Transactions on Information Theory, 57(10):6734-6753, 2011.
6. Sameer Pawar, Salim El Rouayheb, and Kannan Ramchandran. Securing dynamic distributed storage systems from malicious nodes. In Informa-tion Theory Proceedings (ISIT), 2011 IEEE International Symposium on, pages 1452-1456. IEEE, 2011.
7. Nihar B Shah, K V Rashmi, and P Vijay Kumar. Information-theoretically secure regenerating codes for distributed storage. In Global Telecommunications Conference (GLOBECOM 2011), 2011 IEEE, pages 1-5. IEEE, 2011.
8. Ankit Singh Rawat, Onur Ozan Koyluoglu, Natalia Silberstein, and Sriram Vishwanath. Optimal locally repairable and secure codes for distributed storage systems. IEEE Transactions on Information Theory, 60(1):212-236, 2014.
9. Alexandros G Dimakis, Vinod Prabhakaran, and Kannan Ramchandran. Distributed fountain codes for networked storage. In Acoustics, Speech and Signal Processing, 2006. ICASSP 2006 Proceedings. 2006 IEEE International Conference on, volume 5, pages V-V. IEEE, 2006.
10. Siddhartha Kumar, Eirik Rosnes, and Alexandre Graell i Amat. Secure repairable fountain codes. IEEE Communications Letters, 20(8):1491-1494, 2016.
11. Ning Cai and Raymond W Yeung. Secure network coding. In Infor-mation Theory, 2002. Proceedings. 2002 IEEE International Symposium on, page 323. IEEE, 2002.
12. Kapil Bhattad, Krishna R Narayanan, et al. Weakly secure network coding. NetCod, April, 104, 2005.
13. Swanand Kadhe and Alex Sprintson. On a weakly secure regenerating code construction for minimum storage regime. In Communication, Con-trol, and Computing (Allerton), 2014 52nd Annual Allerton Conference on, pages 445-452. IEEE, 2014.
14. Swanand Kadhe and Alex Sprintson. Weakly secure regenerating codes for distributed storage. In Network Coding (NetCod), 2014 International Symposium on, pages 1-6. IEEE, 2014.
15. Muxi Yan, Alex Sprintson, and Igor Zelenko. Weakly secure data exchange with generalized reed solomon codes. In Information Theory (ISIT), 2014 IEEE International Symposium on, pages 1366-1370. IEEE, 2014.
16. Muxi Yan and Alex Sprintson. Algorithms for weakly secure data exchange. In Network Coding (NetCod), 2013 International Symposium on, pages 1-6. IEEE, 2013.
17. Matthieu Bloch and Joao Barros. Physical-layer security: from informa-tion theory to security engineering. Cambridge University Press, 2011.

18. Willie K Harrison and Steven W McLaughlin. Physical-layer security: Combining error control coding and cryptography. In Communications, 2009. ICC'09. IEEE International Conference on, pages 1-5. IEEE, 2009.
19. Byung-Jae Kwak, Nah-Oak Song, Bumsoo Park, Demijan Klinc, and Steven W McLaughlin. Physical layer security with yarg code. In Emerging Network Intelligence, 2009 First International Conference on, pages 43-48. IEEE, 2009.
20. Mohsen Karimzadeh Kiskani and Hamid R Sadjadpour. Secure coded caching in wireless ad hoc networks. In Computing, Networking and Communications (ICNC), 2017 International Conference on, pages 387-391. IEEE, 2017.
21. Mohsen Karimzadeh Kiskani and Hamid R Sadjadpour. Throughput analysis of decentralized coded content caching in cellular networks. IEEE Transactions on Wireless Communications, 16(1):663-672, 2017.
22. Mohsen Karimzadeh Kiskani and Hamid R Sadjadpour. A secure approach for caching contents in wireless ad hoc networks. IEEE Transactions on Vehicular Technology, 66(11):10249-10258, 2017.
23. Mohsen Karimzadeh Kiskani and Hamid R Sadjadpour. Secure and pri-vate cloud storage systems with random linear fountain codes. In Cloud and Big Data Computing (CBDCOM), 2017 International Conference on. IEEE, 2017.
24. Mohsen Karimzadeh Kiskani, Hamid R Sadjadpour, Mohammad Reza Rahimi, and Fred Etemadieh. Low complexity secure code (LCSC) design for big data in cloud storage systems. In Communications (ICC), 2018 International Conference on. IEEE, 2018.
25. G David Forney Jr. On the role of MMSE estimation in approaching the information-theoretic limits of linear gaussian channels: Shannon meets wiener. arXiv preprint cs/0409053, 2004.

What is claimed is:

1. A method implemented on a hardware processor for secure remote digital storage, the method comprising:
   a. extracting first digital data comprising a number n of portions called chunks, each chunk containing a number Q of bits, wherein $n=2(Q+1)$;
   b. determining a first random value for mapping each chunk to only one batch of M numbered batches of two or more chunks of the n chunks, and storing securely second digital data that indicates the mapping;
   c. determining a second independent random value for a key containing Q+1 bits;
   d. combining a bit based on a bit from the key with each chunk of a next batch of chunks to produce a next batch of enhanced chunks, each enhanced chunk containing Q+1 bits and each enhanced chunk of the next batch of enhanced chunks having a bit based on the bit from the key at a location based on a number of the next chunk;
   e. repeating step c with each non-overlapping batch of chunks, each enhanced chunk of the non-overlapping batch of enhanced chunks having a bit based on a different bit from the key;
   f. combining a unique set of the enhanced chunks with a bit by bit exclusive OR operation to produce an encoded chunk, wherein every bit of the encoded chunk is based at least in part on a bit from the key;
   g. storing securely third data that indicates an encoding vector B that indicates the unique set of enhanced chunks combined; and
   h. causing the encoded chunk to be exposed publically.

2. A method as recited in claim 1, further comprising repeating steps f, g and h until n unique encoded chunks are produced and stored publically and n encoding vectors B are stored securely.

3. A method as recited in claim 2, further comprising repeating steps a through h for each group of n chunks until all digital data in a target digital data file are stored publically as encoded chunks.

4. A method as recited in claim 1, wherein each batch of chunks is a pair of chunks.

5. A method as recited in claim 2, further comprising decoding the n encoded chunks based on n encoding vectors B and the mapping stored securely to produce the n chunks.

6. A method as recited in claim 1, wherein: storing securely includes storing locally; and, storing publically includes storing remotely.

7. A method as recited in claim 1, wherein each enhanced chunk of the next batch of enhanced chunks has a bit based on the bit from the key at a location equal to the number of the next batch.

8. A method as recited in claim 2, further comprising decoding the n unique encoded chunks based on the n encoding vectors B stored securely and the second data that indicates the mapping stored securely.

9. A non-transitory computer-readable medium carrying one or more sequences of instructions, wherein execution of the one or more sequences of instructions by one or more processors causes the one or more processors to perform the steps of:
   a. extracting first digital data comprising a number n of portions called chunks, each chunk containing a number Q of bits, wherein $n=2(Q+1)$;
   b. determining a first random value for mapping each chunk to only one batch of M numbered batches of two or more chunks of the n chunks, and storing securely second digital data that indicates the mapping;
   c. determining a second independent random value for a key containing Q+1 bits;
   d. combining a bit based on a bit from the key with each chunk of a next batch of chunks to produce a next batch of enhanced chunks, each enhanced chunk containing Q+1 bits and each enhanced chunk of the next batch of enhanced chunks having a bit based on the bit from the key at a location based on a number of the next batch;
   e. repeating step c with each non-overlapping batch of chunks, each chunk of the non-overlapping batch of enhanced chunks having a bit based on a different bit from the key;
   f. combining a unique set of the enhanced chunks with a bit by bit exclusive OR operation to produce an encoded chunk, wherein every bit of the encoded chunk is based at least in part on a bit from the key;
   g. storing securely third data that indicates an encoding vector B that indicates the unique set of enhanced chunks combined; and
   h. causing the encoded chunk to be exposed publically.

10. A system comprising:
    at least one processor; and
    at least one memory including one or more sequences of instructions,
    the at least one memory and the one or more sequences of instructions configured to, with the at least one processor, cause the system to perform at least the following,
    a. extracting first digital data comprising a number n of portions called chunks, each chunk containing a number Q of bits, wherein $n=2(Q+1)$;

b. determining a first random value for mapping each chunk to only one batch of M numbered batches of two or more chunks of the n chunks, and storing securely second digital data that indicates the mapping;
c. determining a second independent random value for a key containing Q+1 bits;
d. combining a bit based on a bit from the key with each chunk of a next batch of chunks to produce a next batch of enhanced chunks, each enhanced chunk containing Q+1 bits and each enhanced chunk of the next batch of enhanced chunks having a bit based on the bit from the key at a location based on a number of the next batch;
e. repeating step c with each non-overlapping batch of chunks, each chunk of the non-overlapping batch of enhanced chunks having a bit based on a different bit from the key;
f. combining a unique set of the enhanced chunks with a bit by bit exclusive OR operation to produce an encoded chunk, wherein every bit of the encoded chunk is based at least in part on a bit from the key;
g. storing securely third data that indicates an encoding vector B that indicates the unique set of enhanced chunks combined; and
h. causing the encoded chunk to be exposed publically.

* * * * *